US 008585173B2

(12) United States Patent
Mizes et al.

(10) Patent No.: US 8,585,173 B2
(45) Date of Patent: Nov. 19, 2013

(54) TEST PATTERN LESS PERCEPTIBLE TO HUMAN OBSERVATION AND METHOD OF ANALYSIS OF IMAGE DATA CORRESPONDING TO THE TEST PATTERN IN AN INKJET PRINTER

(75) Inventors: Howard A. Mizes, Pittsford, NY (US); Michael C. Mongeon, Walworth, NY (US); Jeffrey J. Folkins, Rochester, NY (US); Charles D. Rizzolo, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 402 days.

(21) Appl. No.: 13/026,988

(22) Filed: Feb. 14, 2011

(65) Prior Publication Data
US 2012/0206531 A1  Aug. 16, 2012

(51) Int. Cl.
  B41J 29/393 (2006.01)
  B41J 29/38 (2006.01)
(52) U.S. Cl.
  USPC .................................. 347/19; 347/14
(58) Field of Classification Search
  CPC ................ B41J 2/2139; B41J 3/543
  USPC .................................. 347/14, 15, 19
  See application file for complete search history.

(56) References Cited

U.S. PATENT DOCUMENTS

| 4,401,024 | A | 8/1983 | Frentress |
| 4,675,696 | A | 6/1987 | Suzuki |
| RE32,967 | E | 6/1989 | St. John et al. |
| 4,887,530 | A | 12/1989 | Sainio |
| 5,325,159 | A | 6/1994 | Day |
| 5,343,231 | A | 8/1994 | Suzuki |
| 5,451,990 | A | 9/1995 | Sorenson et al. |
| 5,539,498 | A | 7/1996 | De Cock et al. |
| 5,600,350 | A | 2/1997 | Cobbs et al. |
| 5,796,414 | A | 8/1998 | Sievert et al. |
| 5,887,236 | A | 3/1999 | Hirao et al. |
| 5,992,973 | A | 11/1999 | Wen |
| 6,049,680 | A | 4/2000 | Goris et al. |
| 6,072,587 | A | 6/2000 | Hicks |
| 6,076,915 | A | 6/2000 | Gast et al. |
| 6,089,693 | A | 7/2000 | Drake et al. |
| 6,109,722 | A | 8/2000 | Underwood et al. |
| 6,196,652 | B1 | 3/2001 | Subirada et al. |
| 6,266,437 | B1 | 7/2001 | Eichel et al. |
| 6,275,600 | B1 | 8/2001 | Banker et al. |
| 6,300,968 | B1 | 10/2001 | Kerxhalli et al. |
| 6,334,720 | B1 | 1/2002 | Kato et al. |

(Continued)

FOREIGN PATENT DOCUMENTS

EP  0 895 869 A2  2/1999

OTHER PUBLICATIONS

Office Action for U.S. Appl. No. 12/754,730, mailed Jun. 6, 2012, United States Patent and Trademark Office (9 pages).

(Continued)

*Primary Examiner* — An Do
(74) *Attorney, Agent, or Firm* — Maginot, Moore & Beck, LLP

(57) ABSTRACT

A method generates a test pattern on an image receiving member that is less perceptible to human observation, but still detectable by an imaging device within a printer. A method implemented in the printer analyzes image data of the dashes in the test pattern that were randomly distributed in the process direction within an area of the image receiving member to identify positions for printheads in the printer and detect missing inkjets in the printheads.

26 Claims, 11 Drawing Sheets

(56) References Cited

U.S. PATENT DOCUMENTS

| | | |
|---|---|---|
| 6,352,331 B1 | 3/2002 | Armijo et al. |
| 6,377,758 B1 | 4/2002 | OuYang et al. |
| 6,467,867 B1 | 10/2002 | Worthington et al. |
| 6,494,558 B1 | 12/2002 | Doval et al. |
| 6,554,390 B2 | 4/2003 | Arquilevich et al. |
| 6,637,853 B1 | 10/2003 | Ahne et al. |
| 6,639,669 B2 | 10/2003 | Hubble, III et al. |
| 6,655,771 B2 | 12/2003 | Matsumoto et al. |
| 6,847,465 B1 | 1/2005 | Wetchler et al. |
| 6,883,892 B2 | 4/2005 | Sievert et al. |
| 6,942,313 B2 | 9/2005 | Kanda |
| 6,993,275 B2 | 1/2006 | Mitsuya et al. |
| 7,073,883 B2 | 7/2006 | Billow |
| 7,118,188 B2 | 10/2006 | Vilanova et al. |
| 7,216,948 B2 | 5/2007 | Matsuzaki et al. |
| 7,254,254 B2 | 8/2007 | Ueda et al. |
| 7,309,118 B2 | 12/2007 | Mizes et al. |
| 7,380,897 B2 | 6/2008 | Anderson et al. |
| 7,390,073 B2 | 6/2008 | Bailey et al. |
| 7,391,525 B2 | 6/2008 | Chapman et al. |
| 7,478,894 B2 | 1/2009 | Kim et al. |
| 7,515,305 B2 | 4/2009 | Mizes |
| 7,549,721 B2 | 6/2009 | Nakano et al. |
| 7,552,986 B2 | 6/2009 | Mizes et al. |
| 7,584,699 B2 | 9/2009 | Ford |
| 7,607,752 B2 | 10/2009 | Childers et al. |
| 7,630,519 B2 | 12/2009 | Nagarajan |
| 7,630,653 B2 | 12/2009 | Bonino |
| 7,637,586 B2 | 12/2009 | Yun |
| 7,647,018 B2 | 1/2010 | Moore et al. |
| 7,686,298 B2 | 3/2010 | Fioravanti et al. |
| 2002/0131800 A1 | 9/2002 | Jacob et al. |
| 2002/0135629 A1 | 9/2002 | Sarmast et al. |
| 2003/0082360 A1 | 5/2003 | O'Donnell et al. |
| 2003/0231350 A1 | 12/2003 | Yamagishi |
| 2004/0160468 A1 | 8/2004 | Kim et al. |
| 2005/0099447 A1 | 5/2005 | Hsu et al. |
| 2006/0072939 A1 | 4/2006 | Kremer et al. |
| 2006/0109329 A1 | 5/2006 | Holtman et al. |
| 2006/0109330 A1 | 5/2006 | Holtman |
| 2006/0114302 A1 | 6/2006 | Holtman |
| 2008/0062219 A1 | 3/2008 | Mizes et al. |
| 2008/0124158 A1 | 5/2008 | Folkins |
| 2009/0265950 A1 | 10/2009 | Mizes et al. |
| 2009/0293750 A1 | 12/2009 | Haenni et al. |
| 2009/0322849 A1 | 12/2009 | Calamita et al. |
| 2010/0013882 A1 | 1/2010 | Mizes et al. |
| 2012/0056928 A1 | 3/2012 | Powers et al. |
| 2012/0155894 A1 | 6/2012 | Kim et al. |

OTHER PUBLICATIONS

Amendment in Response to Office Action for U.S. Appl. No. 12/754,730, submitted Sep. 5, 2012 (14 pages).

Office Action for U.S. Appl. No. 12/754,735, mailed Jun. 4, 2012, United States Patent and Trademark Office (6 pages).

Amendment in Response to Office Action for U.S. Appl. No. 12/754,735, submitted Aug. 6, 2012 (7 pages).

Office Action for U.S. Appl. No. 12/754,867, mailed Apr. 9, 2012, United States Patent and Trademark Office (7 pages).

Amendment in Response to Office Action for U.S. Appl. No. 12/754,867, submitted May 1, 2012 (6 pages).

Second Office Action for U.S. Appl. No. 12/754,867, mailed Jul. 10, 2012, United States Patent and Trademark Office (7 pages).

Amendment in Response to Second Office Action for U.S. Appl. No. 12/754,867, submitted Sep. 10, 2012 (10 pages).

TEST PATTERN LESS PERCEPTIBLE TO HUMAN OBSERVATION AND METHOD OF ANALYSIS OF IMAGE DATA CORRESPONDING TO THE TEST PATTERN IN AN INKJET PRINTER

TECHNICAL FIELD

This disclosure relates generally to identification of printhead position in an inkjet printer having one or more printheads, and, more particularly, to analysis of image data to identify missing inkjets in the printheads.

BACKGROUND

A typical inkjet printer uses one or more printheads to form an ink image on an image receiving member. Each printhead typically contains an array of individual nozzles for ejecting drops of ink across an open gap to an image receiving member to form an image. The image receiving member may be a continuous web of recording media, a series of media sheets, or the image receiving member may be a rotating surface, such as a print drum or endless belt. Images printed on a rotating surface are later transferred to recording media by mechanical force in a transfix nip formed by the rotating surface and a transfix roller. In an inkjet printhead, individual piezoelectric, thermal, or acoustic actuators generate mechanical forces that expel ink through an orifice from an ink filled conduit in response to an electrical voltage signal, sometimes called a firing signal. The magnitude, or voltage level, of the signals affects the amount of ink ejected in each drop. The firing signal is generated by a printhead controller in accordance with image data. An inkjet printer forms a printed image in accordance with the image data by printing a pattern of individual ink drops at particular locations on the image receiving member. The locations where the ink drops landed are sometimes called "ink drop locations," "ink drop positions," or "pixels." Thus, a printing operation can be viewed as the placement of ink drops on an image receiving member in accordance with image data.

In order for the printed images to correspond closely to the image data, both in terms of fidelity to the image objects and the colors represented by the image data, the printheads must be registered with reference to the imaging surface and with the other printheads in the printer. Registration of printheads is a process in which the printheads are operated to eject ink in a known pattern and then the printed image of the ejected ink is analyzed to determine the orientation of a printhead with reference to the imaging surface and with reference to the other printheads in the printer. Operating the printheads in a printer to eject ink in correspondence with image data presumes that the printheads are level with a width across the image receiving member and that all of the inkjet ejectors in the printhead are operational. The presumptions regarding the orientations of the printheads, however, cannot be assumed, but must be verified. Additionally, if the conditions for proper operation of the printheads cannot be verified, the analysis of the printed image should generate data that can be used either to adjust the printheads so they better conform to the presumed conditions for printing or to compensate for the deviations of the printheads from the presumed conditions.

Analysis of printed images is performed with reference to two directions. "Process direction" refers to the direction in which the image receiving member is moving as the imaging surface passes the printhead to receive the ejected ink and "cross-process direction" refers to the direction across the width of the image receiving member. In order to analyze a printed image, a test pattern needs to be generated so determinations can be made as to whether the inkjets operated to eject ink did, in fact, eject ink and whether the ejected ink landed where the ink would have landed if the printhead was oriented correctly with reference to the image receiving member and the other printheads in the printer. In some printing systems, an image of a printed test pattern is generated by using image data of a test pattern to eject ink onto media or by transferring such a printed test pattern from an image receiving member onto media, discharging the media from the system, and then scanning the image with a flatbed scanner or other known offline imaging device. This method of generating image data of the printed test pattern suffers from the inability to analyze the test pattern in situ and from the inaccuracies imposed by the external scanner.

In some printers, a scanner is integrated into the printer and positioned at a location in the printer that enables an image of an ink image to be generated while the image is on media within the printer or while the ink image is on the rotating image member. These integrated scanners typically include one or more illumination sources and a plurality of optical detectors that receive radiation from the illumination source that has been reflected from the image receiving surface. The radiation from the illumination source is usually visible light, but the radiation may be at or beyond either end of the visible light spectrum. If light is reflected by a white surface, the reflected light has the same spectrum as the illuminating light. In some systems, ink on the imaging surface may absorb a portion of the incident light, which causes the reflected light to have a different spectrum. In addition, some inks may emit radiation in a different wavelength than the illuminating radiation, such as when an ink fluoresces in response to a stimulating radiation. Each optical sensor generates an electrical signal that corresponds to the intensity of the reflected light received by the detector. The electrical signals from the optical detectors may be converted to digital signals by analog/digital converters and provided as digital image data to an image processor.

The environment in which the image data are generated is not pristine. Several sources of noise exist in this scenario and should be addressed in the registration process. For one, alignment of the printheads can deviate from an expected position significantly, especially when different types of imaging surfaces are used or when printheads are replaced. Additionally, not all inkjets in a printhead remain operational without maintenance. Thus, a need exists to continue to register the heads before maintenance can recover the missing jets. Also, some inkjets are intermittent, meaning the inkjet may fire sometimes and not at others. Inkjets also may not eject ink perpendicularly with respect to the face of the printhead. These off-angle ink drops land at locations other than were they are expected to land. Some printheads are oriented at an angle with respect to the width of the image receiving member. This angle is sometimes known as printhead roll in the art. The image receiving member also contributes noise. Specifically, structure in the image receiving surface and/or colored contaminants in the image receiving surface may be confused with ink drops in the image data and lightly colored inks and weakly performing inkjets provide ink drops that contrast less starkly with the image receiving member than darkly colored inks or ink drops formed with an appropriate ink drop mass. Thus, improvements in printed test patterns and the analysis of the image data corresponding to the printed test patterns are useful for identifying printhead orientation deviations and printhead characteristics that affect the ejection of ink from a printhead. Moreover, image data analysis that enables correction of printhead issues or compensation for printhead issues is beneficial.

SUMMARY

A method analyzes image data corresponding to a test pattern randomly distributed in the process direction that was generated on an image receiving member by a printer to identify positions for and registration between printheads in the printer. The method includes identifying in image data of an image receiving member an area of the image receiving member in which a test pattern has been printed, the test pattern having dashes formed with a first predetermined number of ink drops of a first color and dashes formed with a second predetermined number of ink drops of a second color, the first predetermined number being different than the second predetermined number, identifying a process direction position for the test pattern printed in the identified area, the test pattern being formed by each printhead in a printer forming at least one dash in the test pattern, identifying a center of each dash in a cross-process direction, identifying an inkjet ejector that formed each dash in the test pattern, identifying an inkjet ejector expected to form a dash in the test pattern that failed to form the dash, and modifying operation of inkjet ejectors in the printer in response to at least one inkjet ejector being identified as expected to form a dash in the test pattern and failing to form the dash.

To produce test pattern that is less perceptible to the human eye and that also enables the printhead positions to be identified, the printheads of a printer are operated in accordance with a method for printing a test pattern. The method includes operating at least one inkjet ejector in each printhead in a plurality of printheads to eject at least one dash in a test pattern on an image receiving member, the dashes being randomly positioned in a process direction within a test pattern area, and continuing to operate the inkjet ejectors in the plurality of printheads until each inkjet ejector in each printhead has been operated to eject ink to form at least one dash randomly positioned in the process direction in the test pattern.

A printer analyzes image data corresponding to a test pattern randomly distributed in the process direction to identify positions for and registration between printheads in the printer. The printer includes a media transport that is configured to transport media through the printer in a process direction, a plurality of actuators, a plurality of color stations, each color station ejecting ink having a color that is different than the ink ejected by the other color stations in the plurality of color stations, each color station being comprised of a plurality of printheads arranged in columns and rows, an imaging device mounted proximate to a portion of the media transport to generate image data corresponding to a cross-process portion of the media being transported through the printer in the process direction after the media has received ink ejected from the printheads in the color stations, and a controller operatively connected to the imaging device, the plurality of actuators, and the printheads, the controller being configured to (1) identify in image data of the media an area of the media in which a test pattern has been printed, the test pattern having dashes formed with a first predetermined number of ink drops of a first color and dashes formed with a second predetermined number of ink drops of a second color, the first predetermined number being different than the second predetermined number, (2) identify a process direction position for the test pattern printed in the identified area, the test pattern being formed by each printhead in the printer forming at least one dash in the test pattern, (3) identify a center of each dash in a cross-process direction, (4) identify an inkjet ejector that formed each dash in the test pattern, (5) identify an inkjet ejector expected to form a dash in the test pattern that failed to form the dash, and (6) modify operation of inkjet ejectors in the printer in response to at least one inkjet ejector being identified as expected to form a dash in the test pattern and failing to form the dash.

BRIEF DESCRIPTION OF THE DRAWINGS

The foregoing aspects and other features of a printer that generates a test pattern that is less perceptible to the human eye in an inter-document zone and analyzes the image data corresponding to the generated test pattern are explained in the following description, taken in connection with the accompanying drawings.

DETAILED DESCRIPTION

Figure 1:
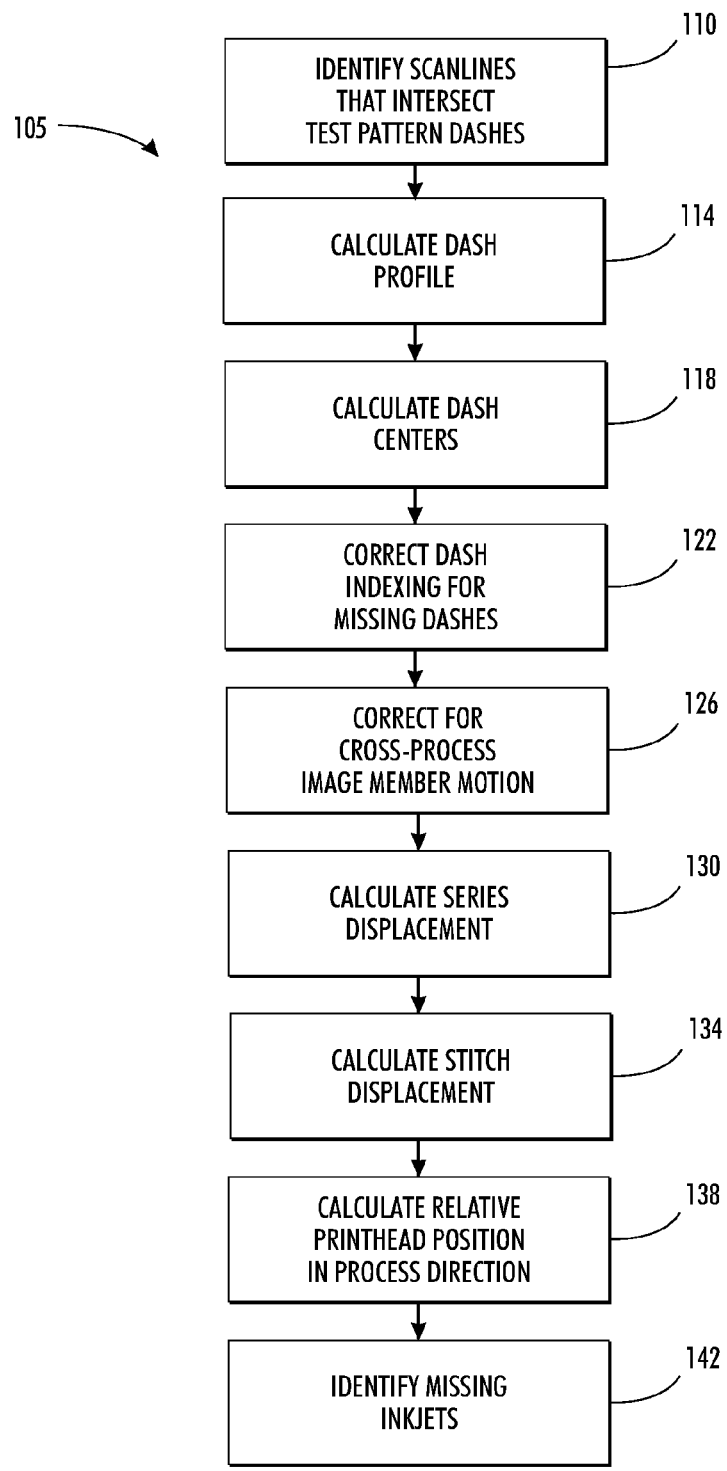
FIG. 1 is a flow diagram of a method for identifying positions of markings in a test pattern.

A process 105 for analyzing image data of a test pattern is depicted in FIG. 1. Process 105 employs an imaging device to capture image data of a test pattern printed on the surface of an image receiving member in a printing system. This analysis enables the positions of the dashes in a test pattern less visually perceptible than previously used patterns to be identified accurately and the positional information for the dashes may be used to determine the position and orientation of the printheads. The imaging device in one embodiment includes an array of optical detectors mounted to a bar or other longitudinal structure that extends across the width of an imaging area on the image receiving member. In one embodiment in which the imaging area is approximately twenty inches wide in the cross process direction and the printheads print at a resolution of 600 dpi in the cross process direction, over 12,000 optical detectors are arrayed in a single row along the bar to generate a single scanline across the imaging member. The optical detectors are configured in association in one or more light sources that direct light towards the surface of the image receiving member. The optical detectors receive the light generated by the light sources after the light is reflected from the image receiving member. The magnitude of the electrical signal generated by an optical detector in response to light being reflected by the bare surface of the image receiving member is higher than the magnitude of a signal generated in response to light reflected from a drop of ink on the image receiving member. This difference in the magnitude of the generated signal may be used to identify the positions of ink drops on an image receiving member, such as a paper sheet, media web, or print drum. The reader should note, however, that lighter colored inks, such as yellow, cause optical detectors to generate lower contrast signals with reference to uncovered portions of the image receiving member than the contrast signals produced by darker colored inks, such as black, with reference to uncovered portions of the image receiving member. Thus, the contrast signal differences may be used to differentiate between dashes of different colors. The magnitudes of the electrical signals generated by the optical detectors may be converted to digital values by an appropriate analog/digital converter. These digital values are denoted as image data in this document and these data are analyzed to identify positional information about the dashes on the image receiving member as described below.

The ability to differentiate dashes of different ink colors is subject to the phenomenon of missing or weak inkjet ejectors. Weak inkjet ejectors are ejectors that do not respond to a firing signal by ejecting an amount of ink that corresponds to the amplitude or frequency of the firing signal delivered to the inkjet ejector. A weak inkjet ejector, instead, delivers a lesser amount of ink. Consequently, the lesser amount of ink ejected by a weak jet covers less of the image receiving member so the contrast of the signal generated by the optical detector with reference to an uncovered portion of the image receiving member is lower. Therefore, ink drops in a dash ejected by a weak inkjet ejector may result in an electrical signal having a magnitude that is different than that expected. Missing inkjet ejectors are inkjet ejectors that eject little or no ink in response to the delivery of a firing signal. A process for identifying the inkjet ejectors that fail to eject ink drops from the image data for a test pattern is discussed in more detail below.

Figure 2:
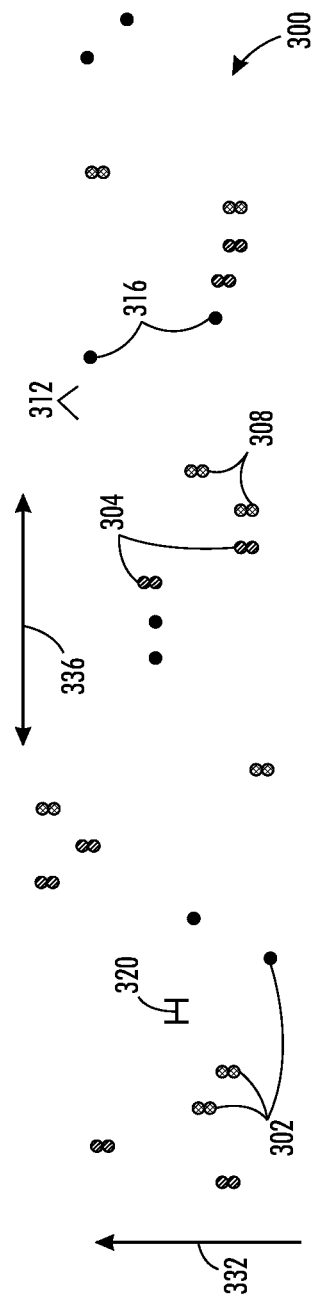
FIG. 2 is a sample test pattern that is less perceptible to human observation and suitable for use with the methods described herein.

An example test pattern suitable for use with an image analyzing process, such as process 105, is depicted in FIG. 2. This type of pattern is adapted to be printed on portions of an image receiving member, such as a paper or film web, that are normally discarded after the printing process. As explained in more detail below, however, the test pattern may be dispersed within the image content of a document provided the area in which the test pattern is printed is relatively free of other ink drops in the cross-process direction. Consequently, the area in which a test pattern, such as the one shown in FIG. 2, is printed is called a dash zone in this document. For example, dash zones in web printing systems may include arrangements of test patterns used for registering printheads. A dash zone may be a relatively short region that is located between document regions in some embodiments and cut away later when a continuous web of paper is cut into individual sheets. In other embodiments the dash zone is a relatively short region in the process direction that is dispersed within the image content of the print job. The test pattern shown in FIG. 2 has been designed to provide minimal visibility to the human eye and yet remain detectable from image data of the test pattern on the image receiving member.

Previously known test patterns included a plurality of dashes, where each dash is formed by ejecting multiple ink drops from a single inkjet ejector in a printhead as the image receiving member moves past the printheads in the process direction. The dashes organized in multiple rows with each row being disposed along the cross-process direction. Each dash in a row began at approximately the same position and each dash, regardless of color, was formed with approximately the same number of ink drops. Consequently, cutting of the image receiving member, such as a paper web, to remove the inter-document zone from the document areas printed with the user's image data could engage the ink on the sheet. Ink debris arising from the cutting could adhere to the cutting blade and produce a need for periodic maintenance to clean the blade. Also, cutting across the test pattern could, in some cases, leave ink at the edges of the document pages. When the document pages were collected and placed in a binder, such as occurs in book construction, the edges of the pages could show perceptible ink patterns. In addition, the dashes may be perceptible at the top and bottom of individual pages.

To reduce the visibility of a test pattern in a dash zone and avoid the issues caused by residual ink on document edges or cutting blades, the test pattern 300 was developed. In the embodiment shown in FIG. 2, the test pattern 300 is configured for use with a printer using cyan, magenta, yellow, and black (CMYK) color stations, although test patterns incorporating the principles described herein could be developed for printers having other colors or other combinations of colors. Test pattern 300 has also been configured for use with printheads in color stations that are arrayed for interlaced printing of the CMYK colors. The dashes are distributed randomly in the process direction. That is, the dashes do not begin at the same position in the process direction, but are distributed over a test pattern zone without forming rows.

In one embodiment the dashes are distributed over a finite region located near to or crossing over a border between documents. In this case, no image content is provided in this region because the content would interfere with the sensing of these dashes. In this embodiment, the dash positions could either a fixed but known pattern or they could be a truly varying pattern as long the dot position information is passed to the image analyzer. In a second embodiment, the dashes are distributed randomly throughout the document. In this case, the image data for the document needs to be analyzed for white non-image spaces in which to place the dashes and where sufficient non-image buffer zone exists around the intended dash positions. In this embodiment, the placed dash position information is passed to the image analyzer. The tighter grouping of the first embodiment noted in this paragraph provides better ejector to ejector registration information whereas the more spread out dash positions of the second embodiment provides a larger number of dashes without being visible.

As used in this document, a dash refers to an arrangement of one or more ink drops on an image receiving member that are formed on the image receiving member by a single inkjet ejector. A test pattern, as used herein, is an arrangement of dashes that enable process direction and cross-process direction positional data to be identified for the printheads in the color stations of a printer. In FIG. 2, the dashes in each column of test pattern 300 are arranged with reference to seven (7) pixels, such that one inkjet ejector in an inkjet printhead forms a dash, and the dash in the next column comes from an inkjet ejector in another printhead that is offset by seven (7)

pixels in the direction of the cross-process axis 336. A pixel refers to the spacing between ink drops in neighboring columns in the cross process direction. Spaces between dashes in adjacent columns of test pattern 300, such as space 320, are the width of the six pixels. Alternative test patterns could produce dashes with a larger or smaller number of pixels to produce a similar test pattern in a dash zone.

The length of the dashes 302 corresponds to the number of drops used to form a dash. Dashes of different colors are produced with different numbers of ink drops. The number of drops is chosen to produce a dash that is detectable by an optical detector as the image receiving member passes the detector in the process direction, but is difficult to perceive by the human eye. The color spectrum of the optical source and the optical detector is a factor in determining the relative sensitivities of the detector to the different ink colors. Accordingly, this factor affects the number of drops needed to make dashes of each color detectable. The distance of the image receiving member imaged by an optical detector is dependent upon the speed of the image member moving past the detector and the line rate of the optical detector. A single row of image data captured by optical detectors extending across the width of the imaging area on the image receiving member is called a scanline in this document. In the embodiment discussed below, the web speed and line scan frequency of the optical detectors yields a scan rate of two hundred and seventy scanlines per inch (spi).

In the embodiment shown in FIG. 2, the cyan dashes 304 are formed with two ink drops, the magenta dashes 308 are formed with two ink drops, the yellow dashes 312 are formed with five ink drops, and the black dashes 316 are formed with a single ink drop. In one embodiment, the length of the dash zone in the process direction 332 is approximately twenty scanlines and extends across the entire width of the image receiving member in the cross-process direction, which in this embodiment is approximately 19.5 inches. The dashes are randomly distributed in the dash in one embodiment by generating a random number in a range from one to a number that enables the entire dash to be printed in the dash zone. For example, in the embodiment being discussed, the random number range for a black dash is one to twenty, the random number range for a magenta dash and a cyan dash is one to nineteen, and the random number range for a yellow dash is one to sixteen. To assign a starting position for a dash, the length of the dash to be printed is subtracted from the randomly generated number.

In order for the optical detectors of the imaging device to be able to image the entire dash zone, multiple scanlines are required. In the embodiment being discussed, one thousand six hundred and sixty-four dashes are printed by the fifty-six printheads in an dash zone. The test pattern 300 of FIG. 2 may be repeated along the cross-process axis in a different dash zone to include a different set of inkjet ejectors from each printhead in a printzone used to form images on an image receiving member passing through the printzone. Although an embodiment that randomly distributes the dashes in the process direction is being discussed, other embodiments may begin or terminate all the dashes on a cut line of an dash zone while still using dashes of different ink drop lengths for differently colored dashes. In addition, although the discussion includes random distribution in the process direction, any distribution that avoids having the dashes intersect a straight line in the cross process direction and avoids introducing periodic pattern will provide a less perceptible inter-document zone pattern.

Figure 3:
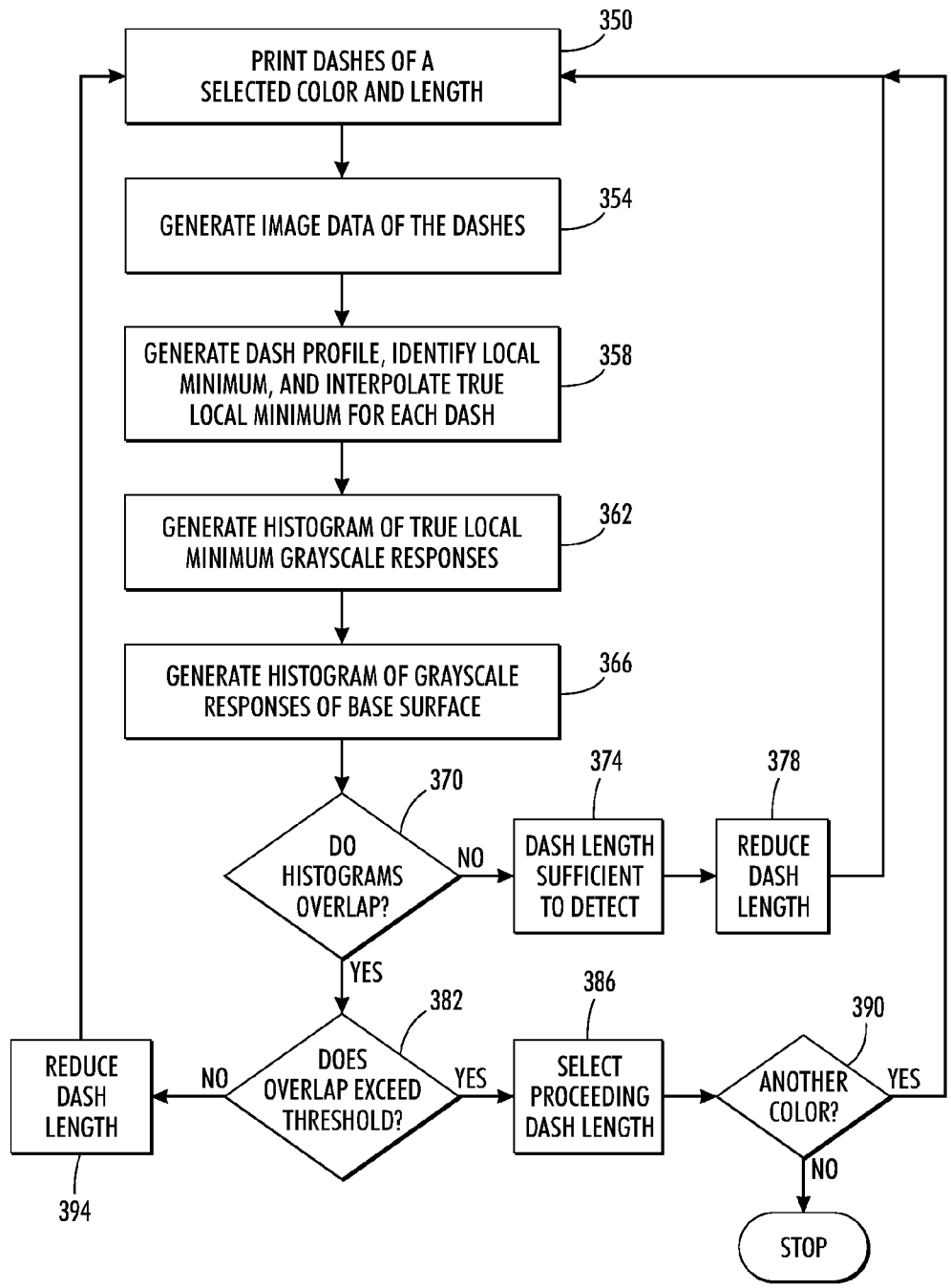
FIG. 3 is a flow diagram of a process to identify a necessary number of ink drops to form a dash for a particular color in a test pattern and still be detectable in the image data of the test pattern.

The embodiment of the test pattern shown in FIG. 2 was developed for use with a CMYK solid ink web printer that ejects ink onto a web of Domtar Husky Offset 75 gsm (grams per square meter) paper. Other dash lengths suitable for other types of image receiving members may be developed with use of the process shown in FIG. 3. A plurality of dashes of a selected length for one color used in a printer are printed on an imaging receiving member (block 350) and the dashes are imaged (block 354). For each colored dash in the image data, a dash profile is generated, a local minimum identified, and a true local minimum interpolated, as described below in more detail below (block 358). A histogram of the values of the local minimums is built (block 362). A similar histogram of the grayscale responses is also constructed for image data of the bare image receiving surface (block 366) and the two histograms are compared (block 370). Both histograms are likely to have a Gaussian shape having a mean and a standard deviation. If the two histograms do not overlap, then dashes of the selected length are easily distinguished from the bare image receiving surface (block 374). The dash length is reduced (block 378) and the process (blocks 350-370) is repeated. As shorter dashes of the color are printed and imaged and the histograms built, the two histograms begin to overlap. The degree of overlap is compared to a predetermined threshold (block 382) and, if the threshold is not exceeded, the dash is reduced (block 394) and the process is repeated (blocks 350-370). This process continues until the overlap between the two histograms exceeds the predetermined threshold and the dash length for the previously tested dash is selected as the dash length for the color being tested (block 386). The threshold is selected to identify an absence of contrast that results in a number of false negative and false positives that prevent reliable detection of the dashes of that particular color. This process is performed for each color (block 390) to identify the shortest dash that can be printed on the image receiving surface that can be reliably detected by the imaging device.

Figure 4:
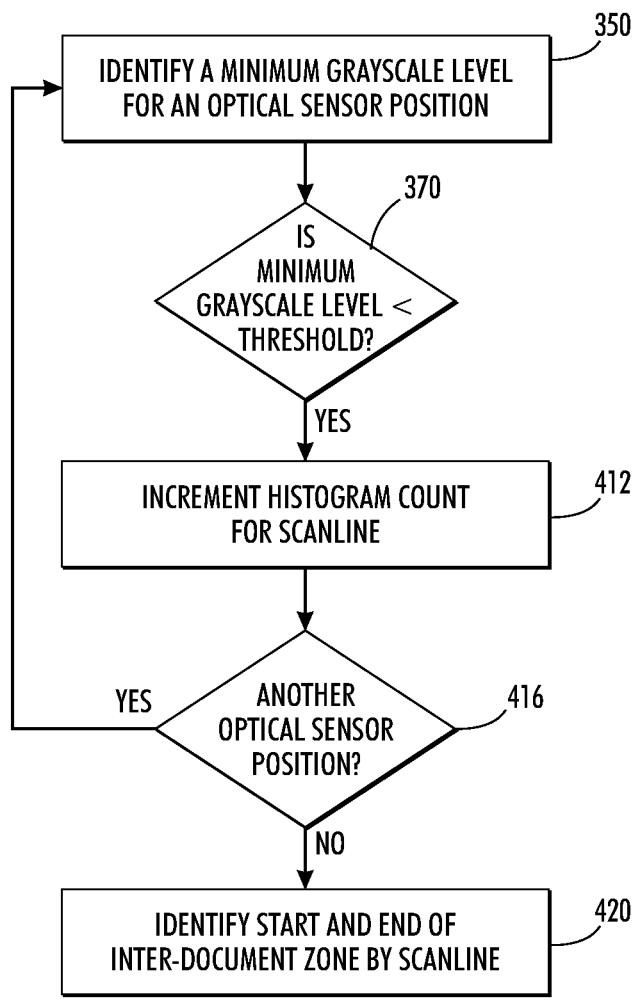
FIG. 4 is a flow diagram of a process to identify a start and an end of a dash zone in which a test pattern has been printed.

The process 105 shown in FIG. 1 is used to analyze a test pattern that is less perceptible to the human eye, such as the one shown in FIG. 2. The process of 105 of FIG. 1 begins by identifying a scanline range in which the ink drops of the test pattern are captured in the image data of the test pattern (block 110). One way to extract the signal corresponding to the positions of the ink drops forming the test pattern is shown in FIG. 4. The signal extraction process begins by identifying a minimum gray scale level for an optical sensor position from the scanlines captured by the optical sensor (block 404) and comparing the identified minimum gray scale level to a grayscale threshold (block 408). If the identified minimum gray scale level is less than the grayscale threshold, a histogram count for the scanline in which this minimum gray scale level appears is incremented by one (block 412). This process continues for all of the optical sensors used to image the test pattern (block 416). The scanlines corresponding to the cells in the histogram that have the largest count values define the scanline range in which the test pattern was printed. The first scanline of this range is identified as the rising edge of the test pattern in the process direction and the last scanline in this range is identified as the falling edge of the test pattern in the process direction (block 420). The histogram enables the random noise caused by structure in the image receiving surface to be filtered out as the sensor position that only experiences such noise is unable to obtain a histogram count that indicates the sensor imaged an ink drop or drops in the test pattern. The scanline range identified for the test pattern may be increased by a predetermined range at one or both edges to ensure some blank image receiving member lines are included on either side of the test pattern in the process direction.

Figure 5:
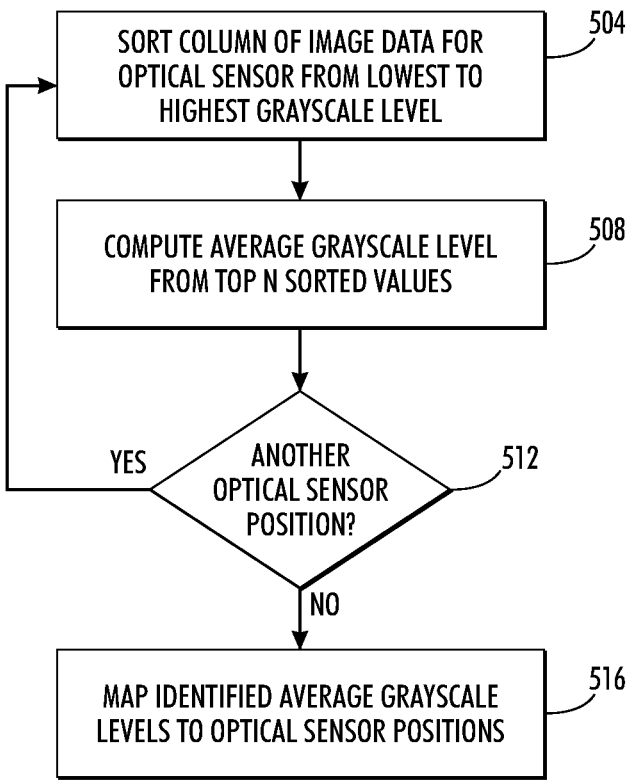
FIG. 5 is a flow diagram of a method for generating a profile of a test pattern from image data of the test pattern.
Figure 6:
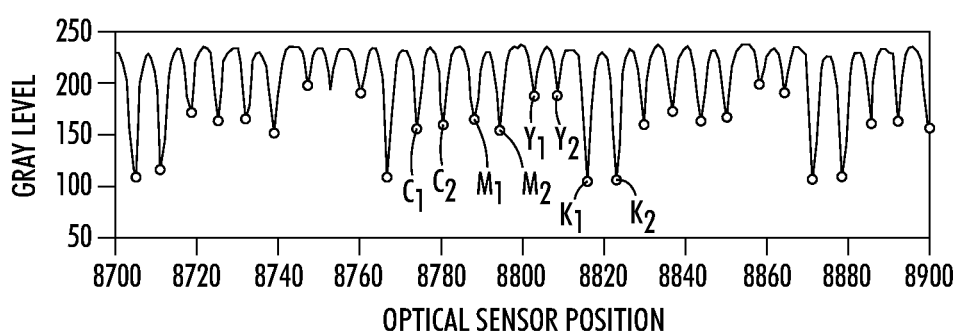
FIG. 6 is a portion of a profile of a test pattern similar to the one shown in FIG. 2.

A dash profile is then identified with reference to the optical detector responses (block 114, FIG. 1). In one embodiment, the dash profile is identified with the process shown in FIG. 5. That process first sorts the grayscale level responses for an optical detector in the identified range of scanlines to position the smallest grayscale value at the top position in the column and the highest grayscale value at the bottom in the column (block 504). An average grayscale value for the first N values in the sorted column is calculated (block 508). This processing is repeated for each optical detector (block 512). Once all of the columns have been sorted and the grayscale averages identified, the averages are mapped across the optical detector positions (block 516). An example of this mapping is shown in FIG. 6. In the portion shown in FIG. 6, the optical detectors corresponding to a local minimum in the grayscale level function are identified as corresponding to the drop positions in the cross-process direction. That is, the grayscale average level is higher at detectors sensing a portion of the image receiving member that has little or no ink on it and the lower values occur where ink drops are present. Accordingly, a small value of N gives a higher contrast signal, but the signal tends to be sensitive to noise in the image receiving surface. A higher value of N reduces the sensitive to noise in the image receiving surface, but produces an average grayscale value that is closer to the grayscale value of the image receiving surface without ink as more grayscale values are included in the average calculation that correspond to the image receiving surface without ink. Consequently, the resulting signal loses contrast. In one embodiment, N was set to the value two because the image receiving surface was relatively free of noise structure. In other embodiments in which the image receiving surface has more noise structure, higher values of N are used to attenuate the noise caused by the structure without sacrificing too much contrast.

The mapping of FIG. 6 is analyzed with the data that yellow drop images have a higher grayscale average than cyan drop images, which have a greater grayscale average than magenta drop images, and black drop images have the smallest grayscale average of all the drop images. Thus, the yellow dashes $Y_1$ and $Y_2$ present local minima that have an average gray level that is higher than the average gray level for other inks $C_1$, $C_2$, $M_1$, $M_2$, $K_1$, and $K_2$ that provide more contrast, which correspond respectively to cyan, magenta, and black colors, respectively. The mapping shown in FIG. 6 depicts a profile through the average grayscale values for the sorted optical detector responses and may be called a dash profile.

Figure 7:
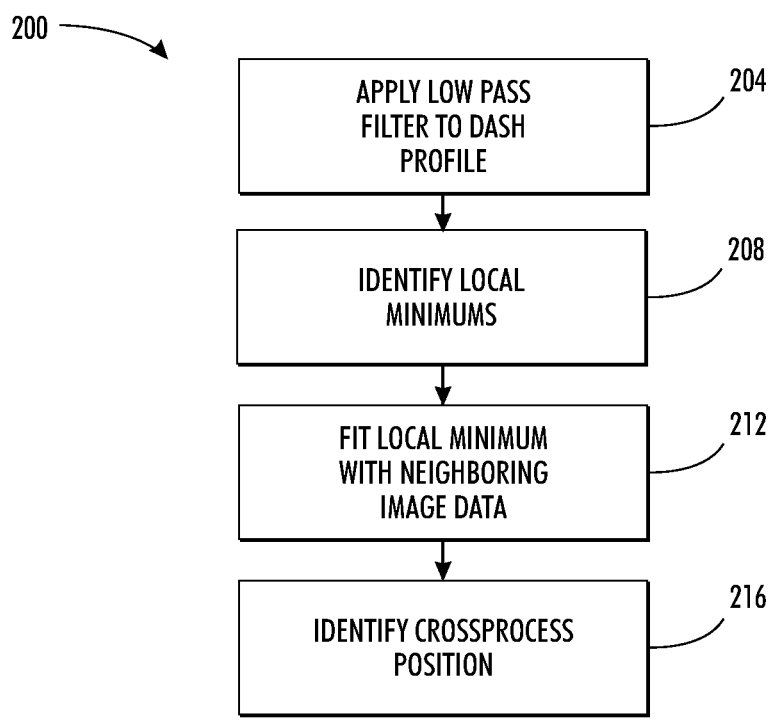
FIG. 7 is a flow diagram of a method for locating the cross-process position of a dash in a test pattern.

The generated dash profile is further analyzed to determine the cross-process locations corresponding to the centers of each dash in the dash profile (block 118, FIG. 1). A filtering and interpolation process, such as the one shown in FIG. 7, may be used to locate the center of each dash. In FIG. 7, process 200 begins by convolving the dash profile data with a low-pass filter kernel function (block 204). The low-pass filtering convolution serves to smooth the scanline data further, eliminating sudden spikes in image data values that are caused by noise instead of by dashes in the image data. A series of local minima are located in the filtered image data (block 208). Each local minimum, identified by the dots in FIG. 6, corresponds to a center of a dash in the filtered image data at the resolution of the optical detectors. To identify the center of a dash more specifically, the local minimum is interpolated with reference to the gray level values from the neighboring pixels on each side of the identified local minima (block 212). This interpolation may be performed by fitting these three data values to a curve to identify the local minimum more precisely. In one interpolation scheme, a quadratic curve is used for the interpolation. The cross-process position of the minimum value of the fitted curve is calculated and stored as the center of a dash in the test pattern (block 216). The processing of blocks 208-216 are carried out for each local minimum identified in the test pattern profile.

The process 105 of FIG. 1 continues by correcting the detected dash indices for missing dashes (block 122). A dash may be missing from the image data for a variety of reasons, but frequently a dash is absent because the inkjet ejector intended to print a dash fails to eject ink in response to a firing signal. The absence and identification of missing dashes may be obtained using several known properties of the test pattern. For one, a larger than expected distance separates the centers of detected dashes in the neighborhood of a missing dash or dashes. If the inter-dash distance exceeds the expected distance by a wide enough margin, then one or more ejectors are deemed to be missing from the test pattern. Another property that may be used is the contrast demonstrated by a dash profile. As noted above, the dash centers correspond to different local minimum values by ink color. Thus, in one embodiment, these differing contrast values are used to identify the color of a missing dash. Accordingly, the number of dashes in an area, the distance between dashes in the area, and the contrast values for the dashes in the area are used to identify missing dashes and the inkjet ejectors that should have printed the missing dash or dashes. The indices of the identified inkjet ejectors are adjusted to take into account the missing dashes. For example, in an array of seven expected dashes where dashes expected at indices 4 and 5 are missing, the centers of dashes 3 and 6 are separated by a distance of approximately three times the normally expected distance. Instead of incorrectly identifying ejector 6 as ejector 4, the process 105 detects the missing dashes and assigns the correct index to ejector 6. Inkjet ejectors that do not generate detected dashes may be indexed separately in order to compensate for inoperable inkjet ejectors or to signal that a printhead is faulty.

A full test pattern that includes dashes ejected from all of the inkjet ejectors in every printhead can be spread over multiple dash zones. Each dash zone receives a dash from at least one inkjet ejector in every printhead. The image receiving member that receives the test pattern moves in the process direction 332 under the ink stations in the print zone. However, the image receiving member may also drift along the cross-process axis 336 as the dashes for the test pattern are formed. Cross-process drift errors may accumulate between dashes in the test pattern, resulting in inaccurate measurements of the cross-process positions for dashes in the test pattern formed in the dash zone.

Process 105 measures and corrects for cross-process displacement caused by drift in the image receiving member (block 126, FIG. 1). To measure the magnitude and direction of media drift, the average detected cross-process positions of every dash in a test pattern is compared to the expected average positions for the dashes. Cross-process displacement is the difference between the measured average position and the expected average position. Averaging the positions of the dashes distinguishes errors in imaging the test pattern that occur due to media drift from errors that may occur with misalignment in a smaller group of ejectors or a single printhead. The process 105 cancels out the effects of media drift by adjusting the detected cross-process positions of dashes in the opposite direction and magnitude of the detected offset. The same correction may be applied to subsequent scanlines to remove errors introduced from cross-process drift for the remaining portion of the test pattern.

The determination of cross-process positions for each ejector in a printing system detailed in blocks 114-126 allows for adjustment of the locations of each droplet crossing an imaging receiving member moving in the process direction. Each drop or drops in a test pattern also occupies a position in the process direction. Unlike the cross-process direction where absolute positions for each ejector are determined, the determination of printhead positions in the process direction is based on the relative positions of the respective printheads. Relative positions are determined because an image receiving member moves past the printheads in a print zone in the process direction, allowing a printhead to eject ink onto any position along the process direction by timing when each ink droplet is ejected. Proper timing allows droplets from multiple printheads to be properly positioned with an image, preventing unintended over-prints or uneven edges where different printheads fire either too early or too late. Printheads that are aligned in the process direction also allow for intentional overprinting, or drop-on-drop printing, where a drop from one printhead mixes with a drop from a different printhead to produce a new color. For example, a drop from a cyan printhead may be ejected first, with a later drop from a corresponding yellow printhead depositing on the cyan drop to form an ink mass that appears to be green. If the relative positions of the printheads are known, the printing system may adjust the operations of the cyan and yellow ejectors to produce the drop-on-drop result.

Once the process direction positions of the printheads are determined, the analysis process 105 identifies the series alignment of different printheads in the print zone (block 130). Series alignment is defined as the cross-process alignment of corresponding ejectors used in corresponding printheads in the print zone. In test patterns printed in multiple dash zones, some of the dashes are generated by an inkjet ejector having the same target position in a printhead of each of the CMYK colors printed in another test pattern in another dash zone. The dashes in a print column are in series alignment because they each have the same cross-process positions so a line passing through the center of each dash can be obtained.

While test pattern 300 shows dashes aligned along cross-process axis 336, dashes belonging to corresponding inkjet ejectors in a print column in subsequent test patterns may be misaligned due to variances in the cross-process positions of different printheads. Using the detected cross-process profiles of test pattern dashes, process 105 compares the cross-process positions from a reference printhead to the cross-process profiles of a second printhead in a print column. A print column corresponds to the printheads arranged in the process direction that are opposite roughly the same portion of the image receiving member. If there is a misalignment between the two printheads, then a target position of the printhead inkjet ejectors shifts. To determine series alignment, one printhead is selected as a reference printhead and a common set of nozzles printed between the reference head and any other head in the print column are identified. For example, if each head has 880 nozzles, and nozzle 1 on the reference head is aligned with nozzle 11 on another head, then 870 nozzles in each printhead are in the overlap region. Next, the difference between the measured nozzle spacing and the expected nozzle spacing is calculated for each pair of nozzles in the two printheads in the overlap region. These measured differences are averaged to give the relative head offset in each print column. The relative head offsets between each head in the print column and the reference head are adjusted so the mean of the relative head offsets sum to zero. The relative head offsets are adjusted by modifying the positions of one or more of the printheads in the print column. In another embodiment, one printhead is designated the reference print head and all other printheads except the reference print head are moved to bring the system into alignment.

The printheads may be adjusted in the cross-process direction using actuators, such as electrical motors, that are operatively connected to a printhead or to a mounting member to which a printhead is mounted. These actuators are typically electro-mechanical devices that respond to control signals that may be generated by a controller configured to implement process 105. In one embodiment, each printhead may be operatively connected to an independent actuator. In alternative embodiments, a group of two or more printheads, typically mounted to a single printhead bar, may be operatively connected to a single actuator to enable movement of the printhead group with the single actuator. All but one of the printheads are further mechanically coupled to independent secondary actuators, with the printhead not having an independent actuator being adjusted solely by the first actuator. This arrangement allows the first actuator to adjust all of the coupled printheads simultaneously, with the secondary independent actuators providing further adjustments to their respective printheads.

Another form of printhead alignment in the cross-process direction is known as stitch alignment. Stitch alignment occurs at the interface boundaries between adjacent printheads in a print array. Many printhead configurations arrange multiple printheads on different rows in a single array to span the entire cross-process width of an image receiving member that passes through the print zone. The multiple printheads are "stitched" together to form a seamless line in the cross process direction. For example, the rightmost inkjet ejectors of printhead 1040 in FIG. 13 can eject ink drops that are adjacent ink drops ejected by the leftmost inkjet ejectors of printhead 1036. Stitch error arises when a gap or overlap exists between edge nozzles of neighboring heads of the same color.

Figure 8:
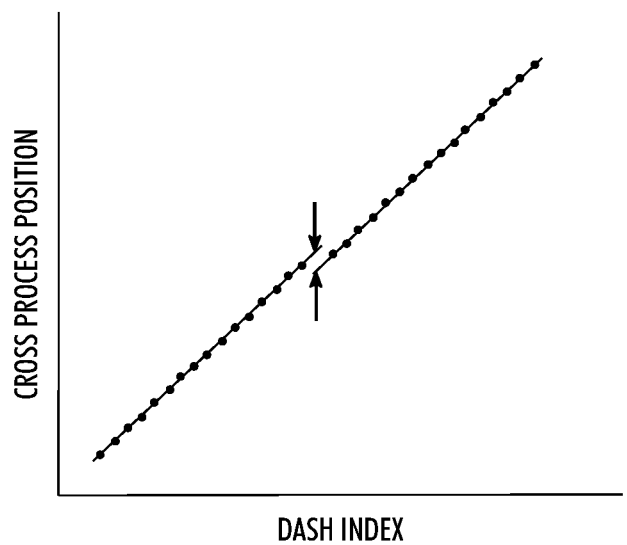
FIG. 8 illustrates a method of computing a stitch displacement between two printheads across a stitch interface.

In process 105 of FIG. 1, X-stitch alignment is calculated from the measurements of the dash position measurements in the cross process direction (block 134). One method of calculating this alignment is illustrated in FIG. 8. For each stitch interface between printheads, the cross process position of the rightmost sixteen nozzles of the printhead on the left side of the stitch interface is plotted against the nozzle index. Nozzle index refers to a number assigned to an inkjet ejector to identify each inkjet ejector uniquely. For example, in a printhead having 880 inkjet ejectors, the inkjet ejectors may be uniquely assigned a number in the range of 1-880. In this plot, the cross process position of the sixteen nozzles of the printhead on the right side of the stitch interface is plotted against the nozzle index. A line is fit through each group of sixteen nozzles and extrapolated to the interface. The difference between the two extrapolated lines is defined as the stitch displacement.

Figure 9:
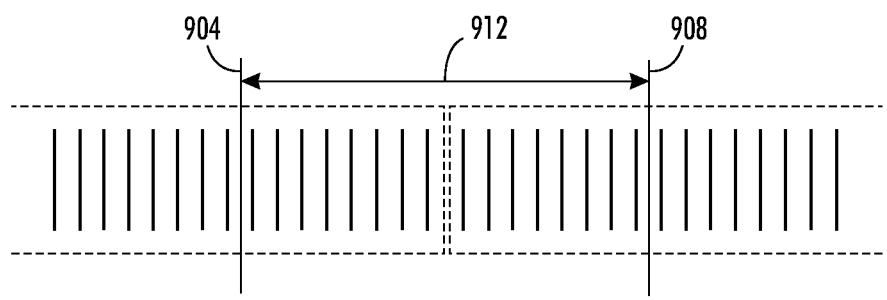
FIG. 9 illustrates an alternative method of computing a stitch displacement between two printheads across a stitch interface.

An alternative calculation of stitch displacement is shown in FIG. 9. In this process, the mean position 904 of the rightmost sixteen nozzles on the printhead on the left side of the stitch interface may be calculated and the mean position 908 of the leftmost sixteen nozzles on the printhead on the right side of the stitch interface may also be calculated. The expected spacing between the mean positions should correspond to sixteen jets. The difference between the measured spacing 912 and the expected spacing is the stitch displacement. Although two processes are described for the computation of stitch displacement, other processes are possible. While the method for computation of the stitch method has been discussed with reference to a group of sixteen nozzles in each printhead on either side of the stitch interface, other numbers of nozzles may be used. Regardless of method, the stitch displacement calculation is performed for each stitch interface in the printer (block 138, FIG. 1).

The registration process 105 determines the relative position of each of the printheads in the process direction (block 138). A test pattern such as test pattern 300 from FIG. 2 is used in one embodiment to detect the offset of each printhead relative to other printheads in the process direction. Printing the test pattern described above within an dash zone of a print job produces 1664 dashes with the dashes being of variable length and randomly distributed in the process direction. Consequently, each printhead in the printing system described above produces twenty-eight dashes in the test pattern. This information is used to detect the relative process direction process of each printhead.

Figure 10:
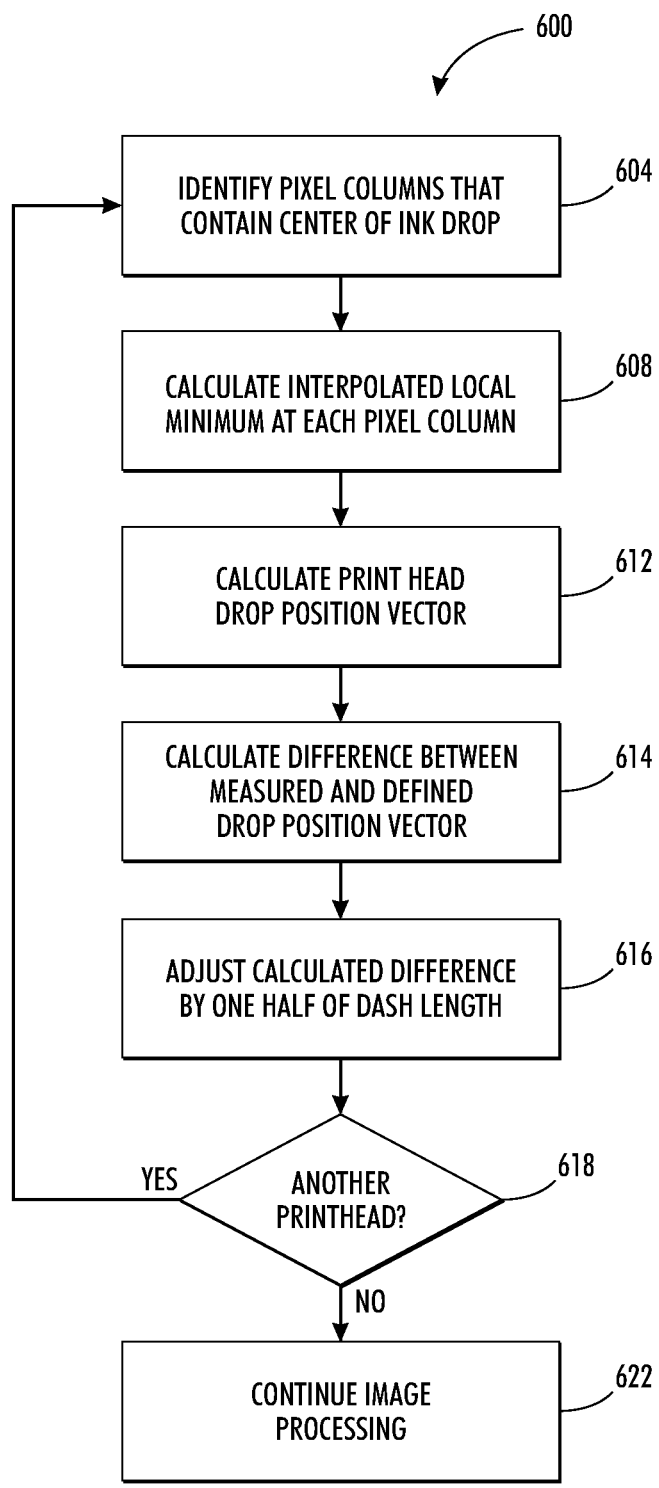
FIG. 10 is a flow diagram of a method for locating the relative position of a printhead in the process direction.
Figure 11:
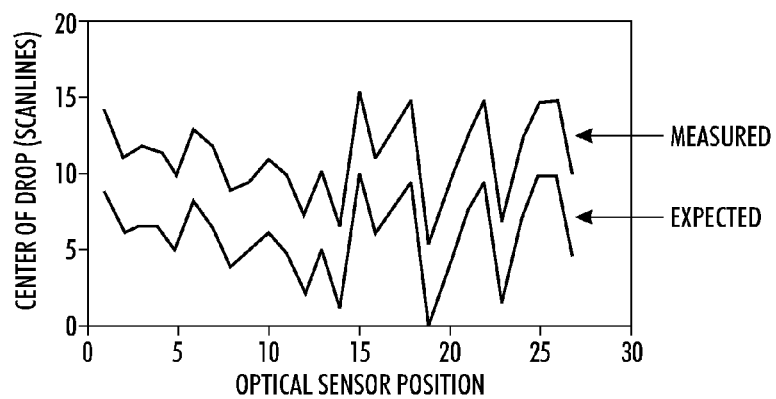
FIG. 11 depicts a vector for ejected ink drop positions measured from the image data for a test pattern and a second vector for expected ink drop positions.

An example process 600 for determining the relative position of each printhead in the process direction is shown in FIG. 10. Process 600 begins by identifying each unsorted column of grayscale data for each optical sensor that detected ink ejected from a single printhead in a test pattern, such as test pattern 300 from FIG. 2 (block 604). In one embodiment, using the grayscale averages, the identified cross-process positions for the centers of the dashes, and the test pattern data used to operate the inkjet ejectors in a printhead to print the dashes, the columns of image data from the optical sensors that detected the center of the ink drops ejected from a single printhead in the test pattern data are identified. One of these identified columns of image data is selected, the local minimum identified, and the true minimum of the profile interpolated through the local minimum (block 608). The identification of the local minimum and the interpolation of the profile to obtain the true local minimum may be implemented in a manner as described above with reference to FIG. 7. This process continues until all of the columns of image data for a printhead have been processed. The true local minimums are the scanline positions of the centers of the dashes formed by the printhead. A vector formed by mapping these true local minima to the indices for the inkjet ejectors that generated the dashes is a random line because the dashes were randomly distributed in the process direction (block 612). The indices are numbers used to identify the inkjet ejectors in a printhead. In one embodiment, the indices begin at the number one for the leftmost inkjet ejector and continue incrementally for each inkjet ejector across the printhead to the rightmost ejector. Another vector is formed by mapping the expected true local minima to the indices for the inkjets operated to form the dashes from the printhead and the differences between these two vectors at each inkjet index are averaged to identify the displacement of the printhead in the process direction (block 614). Following this step, one half of the length of the dash is subtracted from the difference between the two vectors. For example, suppose a black dash that contains 1 drop is being compared to a yellow dash that contains 5 drops. The center of the dash is at the center of the first and only drop for the black dash. The center of the dash is at the center of the third drop for the yellow dash. Therefore, the length of $(5-1)/2=2$ drops of ink in the process direction must be subtracted from all yellow dashes to align the first drop jetted from each dash (block 616). Examples of portions of these two vectors used to compute the differences are shown in FIG. 11. If the process direction displacement of additional printheads needs to be computed (block 618), the process continues (block 604). Otherwise, the image analysis process of FIG. 1 continues (block 622).

Figure 12:
FIG. 12 depicts optical sensor data of a test pattern that has been sorted from the lowest grayscale level to the highest grayscale level.

Once the process direction positions of the printheads are determined from a less perceptible test pattern, such as the one shown above in FIG. 2, the analysis process 105 identifies missing inkjet ejectors (block 142, FIG. 1). As noted above, image data of a test pattern may be sorted within each column of image data generated by an optical detector to produce an array in which the columns of data are ordered from the darkest pixel detected to the lightest pixel detected. If this array were viewed, it looks like FIG. 12. As shown in that figure, the grayscale values corresponding to ink drops in the test pattern are located at or near the top of regularly spaced columns. Analysis of this sorted data can identify a missing or weak inkjet in response to a grayscale value at a position where a darker ink drop grayscale response is expected, but a grayscale value indicative of a bare image receiving member is located instead. As noted above, the grayscale values for lighter color inks may be so close to the grayscale value of a bare image receiving surface that the inkjet may be falsely identified as missing. Additionally, the image receiving surface on which an ink drop was deposited may be particularly bright or the drop may be centered between two scanlines. Consequently, the number of false positives identified by the process 105 may not be insignificant.

Several approaches may be used to evaluate the positives and identify the ones that genuinely indicate missing inkjets and which ones are false positive indications. In one embodiment, the inkjets identified as missing inkjets are checked after at least two test patterns that contain the same ejectors have been printed and analyzed. If the inkjet is identified as missing in the analysis of the two or more test patterns, then a higher probability exists that the inkjet is missing or weak as false positives are likely to be randomly distributed and not likely to be repeated for the same inkjet. In another embodiment, any inkjet identified as being missing is turned off for document printing, but used to print a subsequent set of test patterns. If the analysis of the subsequent set of test patterns indicates any previously turned off inkjet is not identified as being missing, then the turned off inkjets are returned to operation for document printing.

In some print jobs, the document zones may be so short that the analysis performed by process 105 is not completed before the next test pattern is printed in a dash zone. For example, in a print job comprised of four inch postcards, the comparison of the measured printhead position and the actual printhead position (FIG. 11 above) may not be performed before the document zone is in position for printing. In one embodiment, the test patterns in the dash zones are processed asynchronously. All processing in process 105 remains the same until the printhead position in the process direction is to be identified. After the printhead position in the process direction is identified, the standard deviations of the difference between the two vectors for all the test patterns processed up to that time are identified. The smallest standard deviation identifies the test patterns that have been processed and analyzed. The grayscale values for these test patterns are then evaluated for missing inkjets as described above.

In operation, multiple test patterns that are less perceptible to the human eye are printed in the dash zones of a print job until all the inkjets of all of the color stations have been operated to print a dash in one of the dash zone test patterns. The image analysis process 105 of FIG. 1 is performed on the image data for each of these test patterns to enable missing inkjets to be identified or to enable the controller to operate the actuators and move the printheads to compensate for drift that may occur during normal operation. This drift may cause stitch or other registration errors in the printed image. In other embodiments, correction for drift and the resulting errors arising from such drift may be corrected by rearranging pixel data. That is, the positions of the image data used to generate the firing signals for the printhead are shifted in one embodiment to operate the printheads in a manner that compensates for the drift and relative errors. The adjustment process may also be conducted in response to a signal to print test patterns and adjust the printheads generated by a user of the printer. In one embodiment, multiple test patterns are stored in the printer and made available to the customer, who selects one or more test patterns for use in a print job. The various test patterns vary in content that optimizes or makes tradeoffs between human eye visibility or missing jet and registration signal to noise ratio or detection of the pattern with the image detector.

Figure 13:
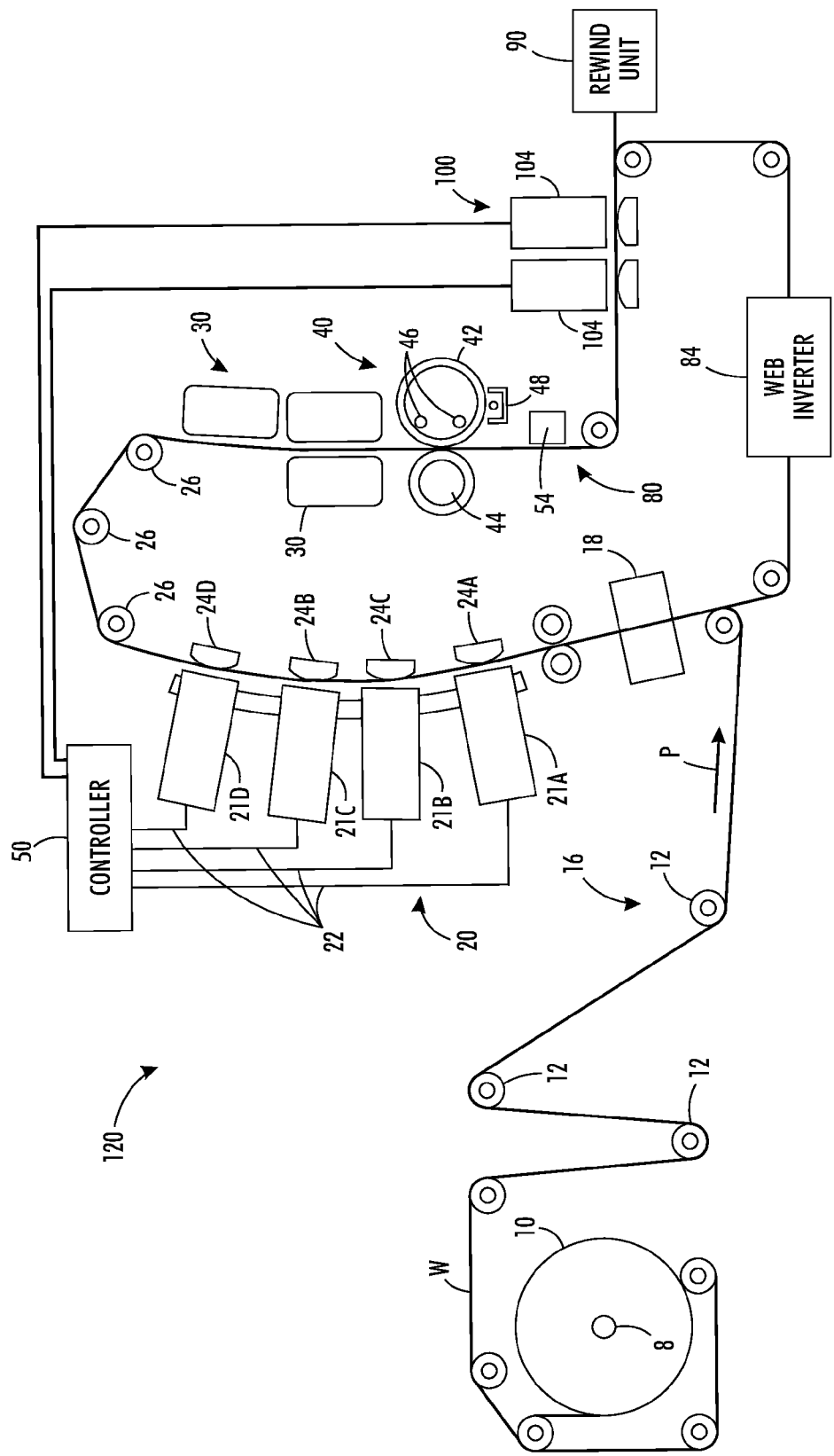
FIG. 13 is a schematic view of a prior art inkjet imaging system that ejects ink onto a continuous web of media as the media moves past the printheads in the system.
Figure 14:
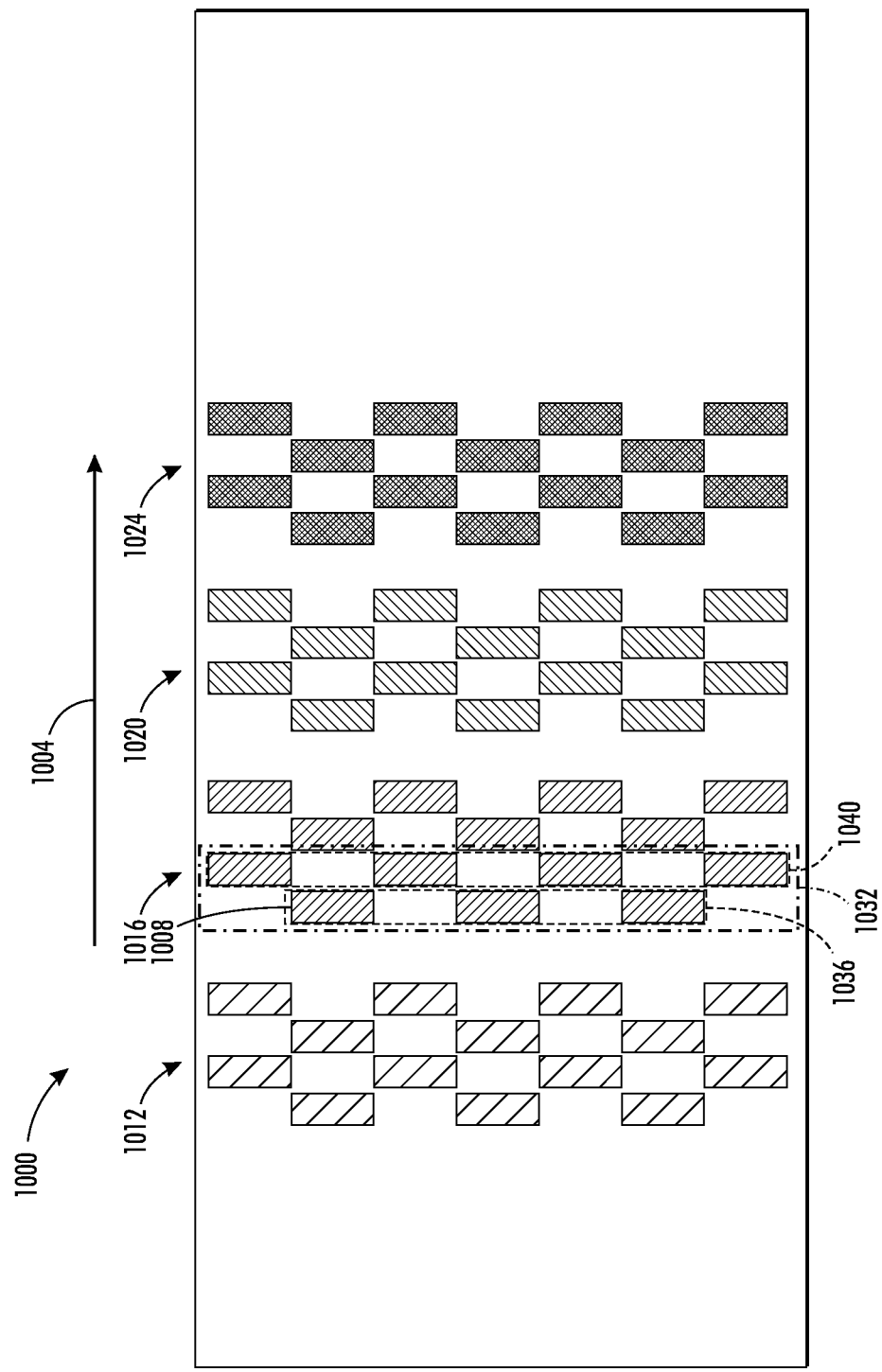
FIG. 14 is a schematic view of a prior art printhead configuration.

Referring to FIG. 13, a prior art inkjet imaging system 120 is shown. For the purposes of this disclosure, the imaging apparatus is in the form of an inkjet printer that employs one or more inkjet printheads and an associated solid ink supply. However, the systems and methods described herein are applicable to any of a variety of other imaging apparatus that use inkjets to eject one or more colorants to a medium or media. The imaging apparatus includes a print engine to process the image data before generating the control signals for the inkjet ejectors. The colorant may be ink, or any suitable substance that includes one or more dyes or pigments and that may be applied to the selected media. The colorant may be black, or any other desired color, and a given imaging apparatus may be capable of applying a plurality of distinct colorants to the media. The media may include any of a variety of substrates, including plain paper, coated paper, glossy paper, or transparencies, among others, and the media may be available in sheets, rolls, or another physical formats.

FIG. 13 is a simplified schematic view of a direct-to-sheet, continuous-media, phase-change inkjet imaging system 120, that may be configured to generate the test patterns that are less perceptible to the human eye, identify missing inkjets, and adjust printheads using the methods discussed above. A media supply and handling system is configured to supply a long (i.e., substantially continuous) web of media W of "substrate" (paper, plastic, or other printable material) from a media source, such as spool of media 10 mounted on a web roller 8. For simplex printing, the printer is comprised of feed roller 8, media conditioner 16, printing station 20, printed web conditioner 80, coating station 100, and rewind unit 90. For duplex operations, the web inverter 84 is used to flip the web over to present a second side of the media to the printing station 20, printed web conditioner 80, and coating station 100 before being taken up by the rewind unit 90. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 100 before being flipped by the inverter 84 and laterally displaced by a distance that enables the web to travel over the other half of the rollers opposite the printing station 20, printed web conditioner 80, and coating station 100 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors, not shown, rotating one or more rollers. The media conditioner includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along an expected path through the imaging device. The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about 30° C. to about 70° C.

The media are transported through a printing station 20 that includes a series of color stations 21A, 21B, 21C, and 21D, each color station effectively extends across the width of the media and is able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four printheads to compute the position of the web as moves past the printheads. The controller 50 uses these data to generate timing signals for actuating the inkjet ejectors in the printheads to enable the four colors to be ejected with a reliable degree of accuracy for registration of the differently color patterns to form four primary-color images on the media. The inkjet ejectors actuated by the firing signals corresponds to image data processed by the controller 50. The image data may be transmitted to the printer, generated by a scanner (not shown) that is a component of the printer, or otherwise generated and delivered to the printer. In various possible embodiments, a printhead module for each primary color may include one or more printheads; multiple printheads in a module may be formed into a single row or multiple row array; printheads of a multiple row array may be staggered; a printhead may print more than one color; or the printheads or portions thereof can be mounted movably in a direction transverse to the process direction P, such as for spot-color applications and the like.

The printer may use "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. In one embodiment, the phase change ink melting temperature is approximately 70° C. to 140° C. In alternative embodiments, the ink utilized in the imaging device may comprise UV curable gel ink. Gel ink may also be heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

Associated with each color station is a backing member 24A-24D, typically in the form of a bar or roll, which is arranged substantially opposite the printhead on the back side of the media. Each backing member is used to position the media at a predetermined distance from the printhead opposite the backing member. Each backing member may be configured to emit thermal energy to heat the media to a predetermined temperature which, in one practical embodiment, is in a range of about 40° C. to about 60° C. The various backer members may be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the printheads of the printing station 20, the temperature of the media is maintained within a given range. Ink is ejected from the printheads at a temperature typically significantly higher than the receiving media temperature. Consequently, the ink heats the media. Therefore other temperature regulating devices may be employed to maintain the media temperature within a predetermined range. For example, the air temperature and air flow rate behind and in front of the media may also impact the media temperature. Accordingly, air blowers or fans may be utilized to facilitate control of the media temperature. Thus, the media temperature is kept substantially uniform for the jetting of all inks from the printheads of the printing station 20. Temperature sensors (not shown) may be positioned along this portion of the media path to enable regulation of the media temperature. These temperature data may also be used by systems for measuring or inferring (from the image data, for example) how much ink of a given primary color from a printhead is being applied to the media at a given time.

Following the printing zone 20 along the media path are one or more "mid-heaters" 30. A mid-heater 30 may use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 is configured to apply heat and/or pressure to the media to fix the images to the media. The fixing assembly may include any suitable device or apparatus for fixing images to the media including heated or unheated pressure rollers, radiant heaters, heat lamps, and the like. In the embodiment of the FIG. 10, the fixing assembly includes a "spreader" 40, that applies a predetermined pressure, and in some implementations, heat, to the media. The function of the spreader 40 is to take what are essentially droplets, strings of droplets, or lines of ink on web W and smear them out by pressure and, in some systems, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web W to a temperature in a range from about 35° C. to about 80° C. In alternative embodiments, the fixing assembly may be configured to spread the ink using non-contact heating (without pressure) of the media after the print zone. Such a non-contact fixing assembly may use any suitable type of heater to heat the media to a desired temperature, such as a radiant heater, UV heating lamps, and the like.

In one practical embodiment, the roller temperature in spreader 40 is maintained at a temperature to an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi lbs/side. Lower nip pressure gives less line spread while higher pressure may reduce pressure roller life.

The spreader 40 may also include a cleaning/oiling station 48 associated with image-side roller 42. The station 48 cleans and/or applies a layer of some release agent or other material to the roller surface. The release agent material may be an amino silicone oil having viscosity of about 10-200 centipoises. Only small amounts of oil are required and the oil carried by the media is only about 1-10 mg per A4 size page. In one possible embodiment, the mid-heater 30 and spreader 40 may be combined into a single unit, with their respective functions occurring relative to the same portion of media simultaneously. In another embodiment the media is maintained at a high temperature as it is printed to enable spreading of the ink.

The coating station 100 applies a clear ink to the printed media. This clear ink helps protect the printed media from smearing or other environmental degradation following removal from the printer. The overlay of clear ink acts as a sacrificial layer of ink that may be smeared and/or offset during handling without affecting the appearance of the image underneath. The coating station 100 may apply the clear ink with either a roller or a printhead 104 ejecting the clear ink in a pattern. Clear ink for the purposes of this disclosure is functionally defined as a substantially clear overcoat ink that has minimal impact on the final printed color, regardless of whether or not the ink is devoid of all colorant. In one embodiment, the clear ink utilized for the coating ink comprises a phase change ink formulation without colorant. Alternatively, the clear ink coating may be formed using a reduced set of typical solid ink components or a single solid ink component, such as polyethylene wax, or polywax. As used herein, polywax refers to a family of relatively low molecular weight straight chain poly ethylene or poly methylene waxes. Similar to the colored phase change inks, clear phase change ink is substantially solid at room temperature and substantially liquid or melted when initially jetted onto the media. The clear phase change ink may be heated to about 100° C. to 140° C. to melt the solid ink for jetting onto the media.

Following passage through the spreader 40 the printed media may be wound onto a roller for removal from the system (simplex printing) or directed to the web inverter 84 for inversion and displacement to another section of the rollers for a second pass by the printheads, mid-heaters, spreader, and coating station. The duplex printed material may then be wound onto a roller for removal from the system by rewind unit 90. Alternatively, the media may be directed to other processing stations that perform tasks such as cutting, binding, collating, and/or stapling the media or the like.

Operation and control of the various subsystems, components and functions of the device 120 are performed with the aid of the controller 50. The controller 50 may be implemented with general or specialized programmable processors that execute programmed instructions. The instructions and data required to perform the programmed functions may be stored in memory associated with the processors or controllers. The processors, their memories, and interface circuitry configure the controllers and/or print engine to perform the functions, such as the difference minimization function, described above. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits.

The imaging system 120 may also include an imaging device 54. The imaging device is configured to detect, for example, the presence, intensity, and/or location of ink drops jetted onto the receiving member by the inkjets of the printhead assembly. In one embodiment, the imaging device includes a light source and a light detector. The light source may be a single light emitting diode (LED) that is coupled to a light pipe that conveys light generated by the LED to one or more openings in the light pipe that direct light towards the image substrate. Most frequently, the imaging system includes a monochromatic source to illuminate the ink on the image receiving member. In another embodiment, three LEDs are used. In this embodiment, one LED generates green light, one LED generates red light, and one LED generates blue light are selectively activated so only one light shines at a time to direct light through the light pipe and be directed towards the image substrate. Another alternative embodiment that uses different colors of light includes a plurality of LEDs arranged in a linear array. The LEDs in this embodiment direct light towards the image substrate. The light source in this embodiment may include three linear arrays, one for each of the colors red, green, and blue. Alternatively, all of the LEDS may be arranged in a single linear array in a repeating sequence of the three colors. The LEDs of the light source may be coupled to the controller 50 or some other control circuitry to activate the LEDs for image illumination.

The reflected light is measured by the light detector in optical sensor 54. The light sensor, in one embodiment, is a linear array of photosensitive devices, such as charge coupled devices (CCDs). The photosensitive devices generate an electrical signal corresponding to the intensity or amount of light received by the photosensitive devices. The linear array that extends substantially across the width of the image receiving member. Alternatively, a shorter linear array may be configured to translate across the image substrate. For example, the linear array may be mounted to a movable carriage that translates across image receiving member. Other devices for moving the light sensor may also be used.

A reflectance may be detected by the light detector in optical sensor 54 that corresponds to each ink jet and/or to each pixel location on the receiving member. The light sensor is configured to generate electrical signals that correspond to the reflected light and these signals are provided to the controller 50. The electrical signals may be used by the controller 50 to determine information pertaining to the ink drops ejected onto the receiving member as described in more detail below. Using this information, the controller 50 may make adjustments to the image data to alter the generation of firing signals to either retard or quicken the ejection of an ink drop or drops from an inkjet ejector.

A schematic view of a prior art print zone 1000 that may be modified to use the test patterns described above is depicted in FIG. 11. The print zone 1000 includes four color stations 1012, 1016, 1020, and 1024 arranged along a process direction 1004. Each color station ejects ink of a color that is different than the other color stations. In one embodiment, color station 1012 ejects cyan ink, color station 1016 ejects magenta ink, color station 1020 ejects yellow ink, and color station 1024 ejects black ink. The process direction is the direction that an image receiving member moves as travels under the color station from color station 1012 to color station 1024. Each color station includes two print arrays, which include two print bars each that carry multiple printheads. For example, the printhead array 1032 of the magenta color station 1016 includes two print bars 1036 and 1040. Each print bar carries a plurality of printheads, as exemplified by printhead 1008. Print bar 1036 has three printheads, while print bar 1040 has four printheads, but alternative print bars may employ a greater or lesser number of printheads. The printheads on the print bars within a print array, such as the printheads on the print bars 1036 and 1040, are staggered to provide printing across the image receiving member at a first resolution. The printheads on the print bars within the print array 1034 within color station 1016 are interlaced and partially overlapped with reference to the printheads in the print array 1032 to enable printing in the colored ink across the image receiving member in the cross process direction at a second resolution. The print bars and print arrays of each color station are arranged in this manner. One printhead array in each color station is aligned with one of the printhead arrays in each of the other color stations. The other printhead arrays in the color stations are similarly aligned with one another. Thus, the aligned printhead arrays enable drop-on-drop printing of different primary colors to produce secondary colors. The interlaced printheads also enable side-by-side ink drops of different colors to extend the color gamut and hues available with the printer.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for analyzing image data of a test pattern generated by a printer comprising:
    identifying in image data of an image receiving member an area of the image receiving member in which a test pattern has been printed, the test pattern having dashes formed with a first predetermined number of ink drops of a first color and dashes formed with a second predetermined number of ink drops of a second color, the first predetermined number being different than the second predetermined number;
    identifying a process direction position for the test pattern printed in the identified area, the test pattern being formed by each printhead in a printer forming at least one dash in the test pattern;
    identifying a center of each dash in a cross-process direction;
    identifying an inkjet ejector that formed each dash in the test pattern;
    identifying an inkjet ejector expected to form a dash in the test pattern that failed to form the dash; and
    modifying operation of inkjet ejectors in the printer in response to at least one inkjet ejector being identified as expected to form a dash in the test pattern and failing to form the dash.

2. The method of claim 1, the process direction identification further comprising:
    identifying a process direction position for dashes randomly distributed in the process direction with the identified area of the image receiving member.

3. The method of claim 2, the identification of the center of each dash further comprising:

generating a profile of the dashes in the image data of the test pattern;

identifying a minimum image data value for each dash in the generated profile in a cross-process direction and an optical detector that generated the minimum image data value;

fitting a curve to the identified minimum image data value for a dash and two image data values, the two image data values corresponding to responses of two optical detectors, one detector being positioned on each side of the optical detector that generated the minimum image data value; and identifying a minimum value of the fitted curve as the center of the dash corresponding to the minimum image data value.

4. The method of claim 3 wherein the curve is a quadratic curve.

5. The method of claim 3, the minimum image data value identification further comprising:

sorting a column of image data for each optical detector in an imaging device used to generate the image data of the image receiving member from a lowest image data value to a highest image data value;

averaging a predetermined number of the lowest image data values in each column to identify the minimum image data value for each optical detector; and identifying the optical detectors that generated the minimum image data values with reference to identified minimum image data values and a threshold.

6. The method of claim 5 wherein a color of ink used to produce a dash in the test pattern is identified with reference to the identified minimum value of the fitted curve.

7. The method of claim 1 further comprising:

identifying a process direction position for each printhead in the printer;

identifying a cross-process displacement for each column of printheads;

identifying a stitch displacement in the cross-process direction between neighboring printheads in a color station that print a same color of ink;

identifying a series displacement in the cross-process direction between neighboring printheads in a color station that print ink in a same print column; and operating an actuator to move at least some of the printheads in the printer with reference to the identified process direction positions, cross-process displacements, the identified stitch displacements, and the identified series displacements.

8. The method of claim 1 further comprising:

identifying a process direction position for each printhead in the printer;

identifying a cross-process displacement for each column of printheads;

identifying a stitch displacement in the cross-process direction between neighboring printheads in a color station that print a same color of ink;

identifying a series displacement in the cross-process direction between neighboring printheads in a color station that print ink in a same print column; and rearranging pixel data to operate at least one printhead with reference to the identified process direction positions, cross-process displacements, the identified stitch displacements, and the identified series displacements.

9. The method of claim 1, the identification of area in which the test pattern is printed further comprising:

identifying scanlines in a column of image data that contains a pixel having a grayscale level that is less than a predetermined threshold;

counting a number of times a scanline contained a pixel below the predetermined threshold; and identifying a start scanline and an end scanline for the area in which the test pattern has been printed with reference to the counted number of times each identified scanline contained a pixel below the predetermined threshold.

10. The method of claim 1, the identification of an inkjet ejector expected to form a dash in the test pattern that failed to form the dash further comprising:

identifying a position in the test pattern corresponding to a missing dash in the row of dashes; and identifying an inkjet ejector that failed to eject ink for the missing dash.

11. A method of printing a test pattern on an image receiving member to identify printhead positions in a printer comprising:

operating at least one inkjet ejector in each printhead in a plurality of printheads to eject at least one dash in a test pattern on an image receiving member, a starting position for each dash in a process direction in the test pattern being identified with reference to a randomly generated number and a length in ink drops of the dash; and continuing to operate the inkjet ejectors in the plurality of printheads until each inkjet ejector in each printhead has been operated to eject ink to form at least one dash having the starting position of the at least one dash in the process direction being identified with reference to a randomly generated number and a length in ink drops of the dash.

12. The method of claim 11, the inkjet ejector operation further comprising:

operating the inkjet ejector to eject a predetermined number of ink drops in a sequence to form a dash.

13. The method of claim 12, the inkjet ejector operation further comprising:

selecting the predetermined number of ink drops for a dash with reference to an ink color for the dash.

14. The method of claim 11 further comprising:

generating the randomly generated number in a range that corresponds to a length of a predetermined area on the image receiving member.

15. The method of claim 11 wherein the length of the dash in ink drops corresponds to an ink color used to produce the dash.

16. The method of claim 15 wherein the length of the dash for a first color of ink differs from the length of the dash for a second color of ink.

17. The method of claim 11 further comprising:

operating the inkjet ejectors to separate adjacent dashes in a row of dashes in the test pattern by a predetermined distance.

18. The method of claim 17 wherein the predetermined distance corresponds to a row of seven pixels on the image receiving member onto which the test pattern was printed.

19. A printer comprising:

a media transport that is configured to transport media through the printer in a process direction;

a plurality of actuators;

a plurality of color stations, each color station ejecting ink having a color that is different than the ink ejected by the other color stations in the plurality of color stations, each color station being comprised of a plurality of printheads arranged in columns and rows;

an imaging device mounted proximate to a portion of the media transport to generate image data corresponding to a cross-process portion of the media being transported through the printer in the process direction after the media has received ink ejected from the printheads in the color stations; and a controller operatively connected to the imaging device, the plurality of actuators, and the printheads, the controller being configured to (1) identify in image data of the media an area of the media in which a test pattern has been printed, the test pattern having dashes formed with a first predetermined number of ink drops of a first color and dashes formed with a second predetermined number of ink drops of a second color, the first predetermined number being different than the second predetermined number, (2) identify a process direction position for the test pattern printed in the identified area, the test pattern being formed by each printhead in the printer forming at least one dash in the test pattern, (3) identify a center of each dash in a cross-process direction, (4) identify an inkjet ejector that formed each dash in the test pattern, (5) identify an inkjet ejector expected to form a dash in the test pattern that failed to form the dash, and (6) modify operation of inkjet ejectors in the printer in response to at least one inkjet ejector being identified as expected to form a dash in the test pattern and failing to form the dash.

20. The printer of claim 19, the controller being further configured to identify a process direction position for dashes randomly distributed in the process direction with the identified area of the media.

21. The printer of claim 19, the controller being further configured to identify a process direction position for each printhead in the printer, identify a cross-process displacement for each column of printheads, identify a stitch displacement in the cross-process direction between neighboring printheads in a color station that print a same color of ink, identify a series displacement in the cross-process direction between neighboring printheads in a color station that print ink in a same print column, and operate an actuator to move at least some of the printheads in the printer with reference to the identified process direction positions, cross-process displacements, the identified stitch displacements, and the identified series displacements.

22. The printer of claim 19, the controller being further configured to identify a process direction position for each printhead in the printer, identify a cross-process displacement for each column of printheads, identify a stitch displacement in the cross-process direction between neighboring printheads in a color station that print a same color of ink, identify a series displacement in the cross-process direction between neighboring printheads in a color station that print ink in a same print column, and rearrange pixel data to operate at least one printhead with reference to the identified process direction positions, cross-process displacements, the identified stitch displacements, and the identified series displacements.

23. The printer of claim 19, the controller being further configured to identify scanlines in a column of image data that contains a pixel having a grayscale level that is less than a predetermined threshold, count a number of times a scanline contained a pixel below the predetermined threshold, and identify a start scanline and an end scanline for the area in which the test pattern has been printed with reference to the counted number of times each identified scanline contained a pixel below the predetermined threshold.

24. The printer of claim 23, the controller being further configured to generate a profile of the dashes in the image data of the test pattern, identify a minimum image data value for each dash in the generated profile in a cross-process direction and an optical detector that generated the minimum image data value, fit a curve to the identified minimum image data value for a dash and two image data values, the two image data values corresponding to responses of two optical detectors, one detector being positioned on each side of the optical detector that generated the minimum image data value, and identify a minimum value of the fitted curve as the center of the dash corresponding to the minimum image data value.

25. The printer of claim 19, the controller being further configured to sort a column of image data for each optical detector in an imaging device used to generate the image data of the image receiving member from a lowest image data value to a highest image data value, average a predetermined number of the lowest image data values in each column to identify the minimum image data value for each optical detector, and identify the optical detectors that generated the minimum image data values with reference to identified minimum image data values and a threshold.

26. The printer of claim 19, the controller being further configured to identify a position in the test pattern corresponding to a missing dash in the row of dashes, and identify an inkjet ejector that failed to eject ink for the missing dash.

* * * * *